United States Patent [19]

Younger

[11] 4,176,563

[45] Dec. 4, 1979

[54] INERTIAL ENERGY STORAGE ROTOR WITH TENSION-BALANCED CATENARY SPOKES

[75] Inventor: Francis C. Younger, Berkeley, Calif.

[73] Assignee: Electric Power Research Institute, Palo Alto, Calif.

[21] Appl. No.: 736,031

[22] Filed: Oct. 27, 1976

[51] Int. Cl.² .................................................. F16F 15/30
[52] U.S. Cl. ....................................... 74/572; 64/27 L; 64/27 NM
[58] Field of Search .................... 64/27 L, 27 NM, 12; 74/572; 310/74, 262

[56] References Cited

U.S. PATENT DOCUMENTS

| | | | |
|---|---|---|---|
| 2,295,348 | 9/1942 | Leach | 64/27 L X |
| 3,248,967 | 5/1966 | Lewis | 74/572 |
| 3,602,066 | 8/1971 | Wetherbee, Jr. | 74/572 |
| 3,964,341 | 6/1976 | Rabenhorst | 74/572 |

FOREIGN PATENT DOCUMENTS 2441555  4/1975  Fed. Rep. of Germany ............. 74/572
400333  10/1933  United Kingdom ....................... 74/572

Primary Examiner—Samuel Scott
Assistant Examiner—Don E. Ferrell
Attorney, Agent, or Firm—Townsend and Townsend

[57] ABSTRACT

A high-speed inertial energy storage rotor having improved spoke elements which connect a fiber-reinforced composite ring to a central hub. The spokes are tension-balanced by the addition of loading weights to their outer ends. These weights increase the centrifugal loading on the spokes such that their elongation at the operating speed of the rotor matches the dilation of the rotor ring. This minimizes radial loading imposed on the ring by the spokes and resulting shear and flexure stresses in the rotor ring and the spoke-to-ring bond. The spokes are pre-shaped to follow a catenary curve at operating speeds so as to place the spoke in pure tension and avoid undesirable bending moments and flexure stresses which would otherwise result.

8 Claims, 4 Drawing Figures

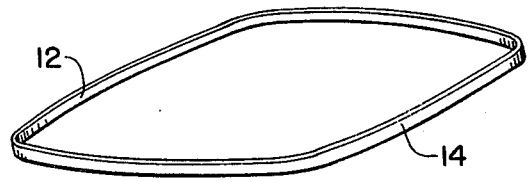
FIG._1.
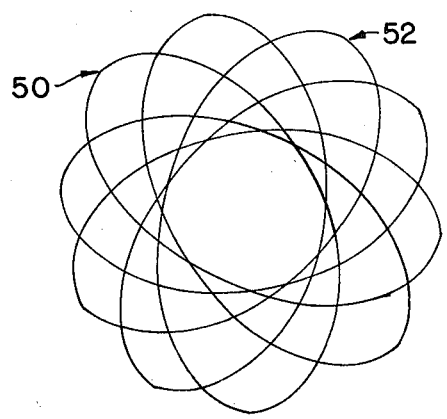
FIG._4.
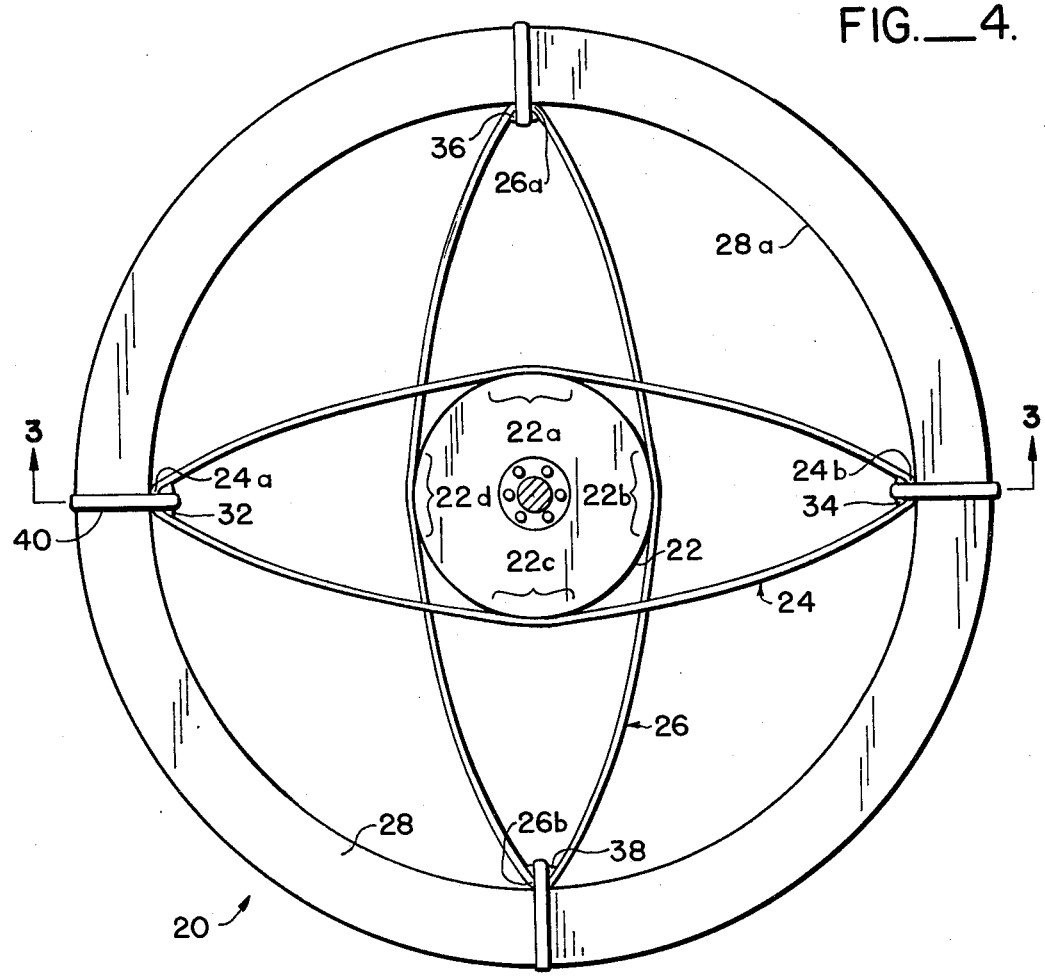
FIG._2.
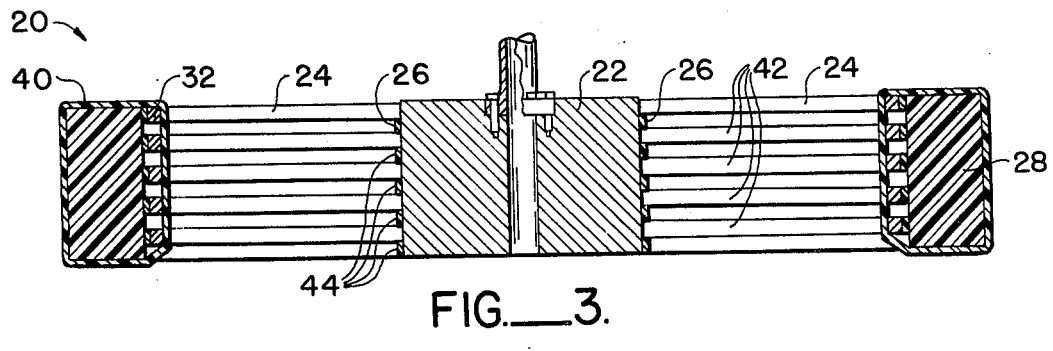
FIG._3.

INERTIAL ENERGY STORAGE ROTOR WITH TENSION-BALANCED CATENARY SPOKES

BACKGROUND OF THE INVENTION

The present invention relates to the construction of high-speed rotors for the storage of inertial energy and is more particularly directed to an improved spoke arrangement for mounting such a rotor to a central hub.

Today's energy shortages make it increasingly necessary to store energy which becomes available during periods of relatively low energy demand for use during peak demand periods. For example, solar energy is readily available during relatively low-demand daytime periods, but is frequently unavailable during the peak-demand evening hour periods.

It has been suggested to store such excess energy in the form of kinetic or inertial energy utilizing very high-speed flywheels or rotors. One such inertial energy storage rotor is disclosed in U.S. Pat. No. 3,683,216 issued to Richard F. Post, and U.S. Pat. No. 3,741,034 issued to Stephen F. Post. In such systems excess energy, in the form of electrical power, is used to drive an electrical motor-generator to spin the rotor at rates of rotation as high as 20,000 RPM and more. To convert this inertial energy back into usable form, the motor-generator is operated in its generator mode to generate electricity while correspondingly decreasing the rotor's rate of rotation, thereby converting the rotor's inertial energy back into electrical power.

The high speeds at which such rotors have to be spun in order to store useful amounts of energy severely stresses the rotor and associated structural elements such as spokes and requires that they be specially constructed to withstand the centrifugal forces generated by such high rates of rotation.

It is known that the stress to which a rotating ring is subjected comprises both hoop stresses, which subject the ring material to circumferential tension, and radial stresses, which subject the material to translaminar tension and shear. In the radial direction, the tensile stresses are carried by the matrix material only, which is relatively weak. Since the radial tensile stress depends upon the ring thickness-to-radius ratio, the ring must be relatively thin to maintain the stresses within the limits of the matrix material. Also, to achieve the required high energy storage densities, materials with a high strength to weight ratio are necessary.

The materials with the highest strength-to-weight ratios currently are fiber materials such as those used for the reinforcement of plastic composites. The fiber composites, therefore, offer the potential of very high energy storage densities. Problems, exist, however, due to orthotropic properties of the composites. They possess very high strength in the direction of the fibers, that is, in a circumferential direction, and very little transverse strength, that is, in a radial direction. Thus, fiber composite materials can withstand only very limited radial forces.

A theoretical ring with no radial thickness would not be subjected to any radial stress but to hoop stresses only. Thus, to limit the radial stresses in such rings to acceptable values, their radial thicknesses must be relatively small. Because the thickness of the rotor ring must necessarily be small in comparison to its diameter, means such as spokes must be provided for structurally connecting the ring to a central hub which is mounted on the motor-generator shaft.

Spokes for supporting high-speed rotor rings of flywheels must satisfy several basic mechanical requirements. They must provide a stable connection between the flywheel hub and ring. This connection must maintain the concentricity and geometric alignment needed for static and dynamic balance and must be rigid enough to resist the radial and gyroscopic forces which may be imposed. In addition, the spokes must transmit the torque required for high rates of ring acceleration and deceleration.

The spokes for fiber-reinforced composite rotors, such as employed for the storage of inertial energy, have special requirements due to the fact that such rotors have very little strength to resist the shear and flexure stresses which spokes would normally impose upon the rotor ring. The unidirectional fiber-reinforced composites are also very weak in transverse tension. Consequently, the spokes must not impose high radial forces upon the rotor ring at the point of attachment. Any radial loading imposed by the spokes will produce shear and flexure stresses throughout the rotor in addition to the local radial stresses at the attachment point. Such loads may also result in failure of the spoke-to-ring bond.

At high speed, the rotor ring dilates under the action of centrifugal force which produces a high circumferential tensile stress in the ring. The amount of dilation is equal to the product of the initial radius of the ring and the ratio of circumferential tensile stress to the modulus of elasticity of the rotor material. Continuity requires that the spokes must stretch to maintain contact with the rotor ring and the degree of extension must equal the dilation of the ring. The radial stretch of the spokes is equal to the inside radius of the rotor ring at the point of attachment times the ratio of the spoke stress to the spoke modulus of elasticity. Spokes directly attached to a rotor ring will generally require a high radial force to stretch the spoke enough to maintain contact with the ring.

Under the high centrifugal forces to which rotors of the type disclosed in the above referenced U.S. patents are subjected, and the resulting radial dilation, a fiber-reinforced composite spoke simply fastened to the ring produces an excessive radial force on the ring and the bond.

In addition, in order to adequately carry the torsional forces transmitted from the rotor hub to the ring under high rates of acceleration and deceleration, the spokes should be angled rather than radial. This results in the spokes being subjected to a transverse component of centrifugal force which creates bending moments in the spoke. At high rotational speeds these bending moments are significant both because of the high transverse forces and the increased effective stiffness of the spoke under centrifugal elongation.

Thus, it is apparent that prior art inertial energy storage rotors with spokes have serious drawbacks which limit their potential use and which correspondingly limit development of an otherwise highly desirable energy source.

SUMMARY OF THE INVENTION

The present invention provides an inertial energy storage rotor with an improved spoke arrangement for mounting the rotor ring to a central hub. To avoid the imposition of high radial forces upon the rotor ring by the mismatching of ring dilation and spoke extension under centrifugal force, weights are added to the ends of the spokes to increase the centrifugal loading and thereby increase the spoke extension to conform to the rotor dilation. This aspect of the present invention will be referred to herein as "tension-bearing."

To avoid undesirable flexure stresses in the spokes at high speeds, they are curved to assume a shape which places them in pure tension and thus eliminates any transverse component of centrifugal force and consequent shear and flexure loads on the spoke. The precise curvature which allows such a result depends on the spoke end loading conditions and on the amount of centrifugal force and the family of such curves will be referred to herein as "polar catenary." This shape corresponds to that which would be assumed by a flexible rope or cable supported at its ends and acted upon by a centrifugal force field characterized by a load radiating from a central point with a magnitude varying with the radius. The mathematical development for this spoke shape is found in the Appendix below.

DESCRIPTION OF THE DRAWINGS

FIG. 1 is a perspective view of a catenary spoke element according to the present invention.

FIG. 2 is a plan view of the rotor of the present invention.

FIG. 3 is a cross sectional view of the rotor of FIG. 2 taken along lines 3—3.

FIG. 4 is a plan view of a different embodiment of the present invention wherein catenary members are overlapped to form a rotor.

DESCRIPTION OF THE PREFERRED EMBODIMENT

Referring now to the drawing, FIG. 1 illustrates a typical spoke 10 made from a fiber-reinforced composite material.

Because the loading on a tension-balanced spoke is due to the centrifugal force along the spoke and to the centrifugal force acting on the added weight at the outer end of the spoke, a variation in tension occurs along the length of the spoke. The average spoke stress required for continuity must equal the stress in the rotor ring times the ratio of the modulus of elasticity of the spoke to the modulus of elasticity of the rotor ring. If the rotor ring and spoke material have the same modulus of elasticity, the average stress in the spoke will equal that in the ring; however, because of the stress variation along its length, the spoke will have a higher peak stress. If the rotor ring has a higher modulus than the spoke, the stresses in the spoke will be lower.

In view of this, it is preferred to use a rotor ring of fiber-reinforced composite with a high modulus material such as "Kevlar" or graphite which is supported by spokes made from a fiber-reinforced composite of lower modulus material. In such case, the stress in the spoke will be less than that in the ring by the ratio of the moduli. In the preferred embodiment, the spoke material is S-glass/epoxy prepreg which is filament wound.

Spoke 10 is composed of four polar catenary curved segments and four connecting segments which form a closed loop. Spoke elements 12 and 14 are each formed of two catenary curved segments joined together by a connecting segment which approximates the curvature of the rotor hub along an arc of about 20°. Spoke elements 12 and 14 are joined to one another at each end by a curved segment shaped to receive a loading weight as will be described below.

Turning now to FIG. 2, rotor 20 includes hub 22, a plurality of superimposed spoke elements including uppermost elements 24 and 26 and a fiber composite ring 28. Spoke elements 24 and 26 and those which underlie them are overlapped in the form of a four-pointed cross and are affixed to hub 22 along circumferential hub segments 22a-d over an arc of approximately 20°. Epoxy may be used as a bonding agent.

Ends 24a and 24b of spoke element 24 and ends 26a and 26b of spoke element 26 are juxtaposed against the inner surface 28a of rotor ring 28. The inner side of end 24a of spoke 24 is fitted with a loading weight 32 and the opposite end 24b of spoke 24 is fitted with a weight 34. Similarly, spoke 26 (and each of the underlying spoke elements in the rotor assembly) is provided with end loading weights 36 and 38. Fiberglass strip 40 is wound around ring 28, spoke end 24a, loading weight 32, and the underlying spoke ends and loading weights (FIG. 3) and cured with epoxy or other resinous material to form a secure spoke-to-ring joint. Each of the other spoke elements is similarly end loaded and secured.

FIG. 3 depicts a cross sectional view of rotor 20 taken along lines 3—3 of FIG. 2. Uppermost spoke 24 is shown juxtaposed against ring 28 with spoke 26 beneath. A plurality of spokes 42 are positioned beneath and in alignment with spoke 24 and are mounted to hub 22 and ring 28 in a similar manner. Likewise, a plurality of spokes 44 are positioned beneath and in registry with spoke 26. Loading weight 32 is fitted on the inner side of end 24a of spoke 24 and similar weights are fitted to the other spokes. Fiberglass strip 40 is wound around ring 28, spoke end 24a, the ends of spoke elements 42, and their associated weights and cured to form a secure spoke-to-ring joint.

Referring now to FIG. 4, another embodiment of the present invention is shown wherein storage rotor 50 is comprised of a plurality of curved tension members 52 corresponding to spoke element 10 of FIG. 1. These members are attached to a central hub and angularly staggered to collectively form a rotor.

While two specific embodiments of the present invention have been described above, it will be apparent to those skilled in the art that various modifications and adaptations of the disclosed structure are possible without departing from the spirit and scope of the invention as defined by the claims which follows.

APPENDIX

Derivation of Polar Catenary Form

The centrifugal force $F_r$ on any small segment of spoke $\Delta s$ is directed radially outward from the center of rotation of the rotor and has a value:

$$F_r = \frac{w}{g} \Delta s \, r \, \omega^2 \qquad (1)$$

where
 w = spoke weight per unit length
 g = gravitation constant, in./sec.² lb./in.
 r = radius of element, inches  $\omega$ = rotational speed, rad-sec.

The centrifugal force components in orthogonal x and y directions where x is along the spoke segment and y is transverse to the spoke segment are:

$$F_x = \frac{w}{g} \Delta s\, x\, \omega^2 \qquad (2)$$

$$F_y = \frac{w}{g} \Delta s\, y\, \omega^2 \qquad (3)$$

Because of the loading weights at the spoke ends the tensile force in the spoke which opposes the centrifugal forces increases along the spoke in a direction toward the point of attachment with the hub. Thus letting H and V respectively represent the components of this tensile force T in the x and y directions it will be seen from a force balance on the spoke element that:

$$\Delta H = -F_x = -(\frac{w}{g}\omega^2)\, x\, \Delta s \qquad (4)$$

$$\Delta V = -F_y = -(\frac{w}{g}\omega^2)\, y\, \Delta s \qquad (5)$$

letting $$P = \frac{w}{g}\omega^2 \qquad (6)$$

then in the limit as $\Delta s \to 0$ $$\frac{dH}{ds} = -P x \qquad (7)$$

and $$\frac{dV}{ds} = -P y \qquad (8)$$

For completely flexible elements, it can be seen that:

$$\frac{V}{H} = \frac{dy}{dx} \qquad (9)$$

so that $$\frac{dV}{dx} = \frac{d(H\frac{dy}{dx})}{dx} \qquad (10)$$

differentiating (10) gives $$\frac{dV}{dx} = \frac{dH}{dx}\cdot\frac{dy}{dx} + H\frac{d^2y}{dx^2} \qquad (11)$$

Equations 7, 8, and 11 can be solved by finite difference methods starting with initial conditions for T, y and (dy/dx) at x=0; however, it would be of value to have an analytical solution. An approximate solution is easily obtained by substituting $\Delta x$ for $\Delta s$. Such a substitution is quite reasonable for shallow curves where $\Delta x$ is nearly equal to $\Delta s$*.

*Orienting the coordinates so that the x axis nearly parallels the spoke improves this approximation.

Then Equations 7 and 8 become:

$$\frac{dH}{dx} = -P x \qquad (12)$$

$$\frac{dV}{dx} = -P y \qquad (13)$$

Substituting 12 and 13 into 11 yields:

$$H\frac{d^2y}{dx^2}\, Px\frac{dy}{dx} + Py = 0 \qquad (14)$$

However, equation 12 can be solved to give:

$$H = H_o - \frac{1}{2} Px^2 \qquad (15)$$

where $H_o$ is the end loading on the spoke which on substitution in (14) gives:

$$(\frac{2H_o}{P} - x^2)\frac{d^2y}{dx^2} - 2x\frac{dy}{dx} + 2y = 0 \qquad (16)$$

Equation 16 is the differential equation for the shape of a shallow curve for a flexible cord in a centrifugal force field. The equation has variable coefficients and can be solved to yield a power series solution by the method of Frobenius. The details of the solution will not be given here but a back substitution may be made to verify the solution. For convenience, a new parameter should be substituted:

$$\text{Let } q = \frac{P}{2H_o} = \frac{\omega}{2g}\cdot\frac{\omega^2}{H_o} \qquad (17)$$

then the general solution of 16 is:

$$y = C_1(1 - qx^2 - \frac{1}{3}q^2x^4 - \frac{1}{5}q^3x^6 \ldots$$
$$\ldots - \frac{1}{2n-1} q^n x^{2n} \ldots) + C_2 x \qquad (18)$$

where $C_1$ and $C_2$ are aribitrary constants to satisfy initial conditions.

A closed form for the series can be found using the known series $$Ln(\frac{1+\beta}{1-\beta}) = 2(\beta + \frac{1}{3}\beta^3 + \frac{1}{5}\beta^5 + \frac{1}{7}\beta^7 \ldots) \qquad (19)$$

From equation 19, it can be shown that $$\frac{\beta}{2} Ln(\frac{1+\beta}{1-\beta}) = \beta^2 + \frac{\beta^4}{3} + \frac{\beta^6}{5} + \frac{\beta^8}{7} \ldots \qquad (20)$$

letting $$\beta = \sqrt{q}\, x \qquad (21)$$

it can be shown that $$y = C_2 x + C_1 \left[ 1 - \frac{qx}{2} Ln\left(\frac{1+\sqrt{q}\, x}{1-\sqrt{q}\, x}\right) \right] \qquad (22)$$

For the initial value problem, the value of $C_1$ and $C_2$ can be shown from (18) to give:

$$C_1 = y \text{ at } x=0 \qquad (23)$$

$$C_2 = (dy/dx) \text{ at } x=0 \qquad (23)$$

What is claimed is:

1. In an inertial energy storage rotor including a central hub and a concentric annular ring radially spaced therefrom, the improvement comprising:
    a plurality of spoke elements in the shape of an elongate closed loop having a pair of central segments, a pair of opposed end segments, and curved segments connecting said spoke end segments and said spoke central segments, each of said curved segments having a shape substantially that of a polar catenary curve so that at the operating speed of said rotor said spoke elements are subjected generally only to tension forces directed substantially along the curved segments, said spoke elements being connected to said hub along said central segments and to said ring along said end segments; and
    a plurality of weights, each of said weights being secured to a corresponding spoke end segment.

2. An inertial energy storage rotor comprising:
    a central hub;
    an annular ring concentric with the hub and spaced radially outwardly therefrom;
    a plurality of curved spokes connecting said ring and said hub, said spokes lying generally in the plane defined by said annular ring and having a shape substantially that of a polar catenary such that at the operating speed of the rotor the spokes are in pure tension; and
    a plurality of weights, each of said weights being secured to a corresponding spoke proximate its radially outermost end, whereby the centrifugal elongation of the spokes at the operating speed of the rotor corresponds to the circumferential dilation of the ring.

3. An inertial energy storage rotor comprising:
    a central hub;
    an annular ring concentric with the hub and spaced radially outwardly therefrom;
    a plurality of curved spokes connecting said ring and said hub, each of said spokes lying generally in the plane defined by said annular ring and being formed in the shape of an elongate closed loop, said loop having a pair of spaced central segments of circular contour conforming to the circumference of said hub, a pair of arcuate end segments adapted to contact the inner surface of said ring, and four curved segments of substantially polar catenary shape connecting said central segments with said end segments and a plurality of spoke end loading weights, each of said weights being connected to an associated spoke end segment, whereby the centrifugal elongation of the spokes at the operating speed of the rotor corresponds to the circumferential dilation of the rotor ring.

4. The apparatus of claim 3 wherein said rotor ring and said spokes are constructed of a fiber-reinforced composite plastic material.

5. The rotor of claim 4 wherein the modulus of elasticity of the fiber composite material of said rotor is higher than the modulus of elasticity of the fiber composite material of said spoke.

6. The rotor of claim 5 wherein a pair of spokes are overlapped around said hub to form a four-pointed cross concentric therewith.

7. The rotor of claim 6 further comprising additional pairs of overlapped spokes underlying and in registry with said first pair of spokes, each of said additional spokes having associated end loading weights.

8. The rotor of claim 7 wherein said spoke end segments and associated loading weights are secured to said rotor ring by an epoxy bonded strap.

* * * * *